Jan. 28, 1964  E. A. ANDERSON  3,119,426
PITTER FOR DRUPACEOUS FRUITS
Filed March 8, 1961  3 Sheets-Sheet 1
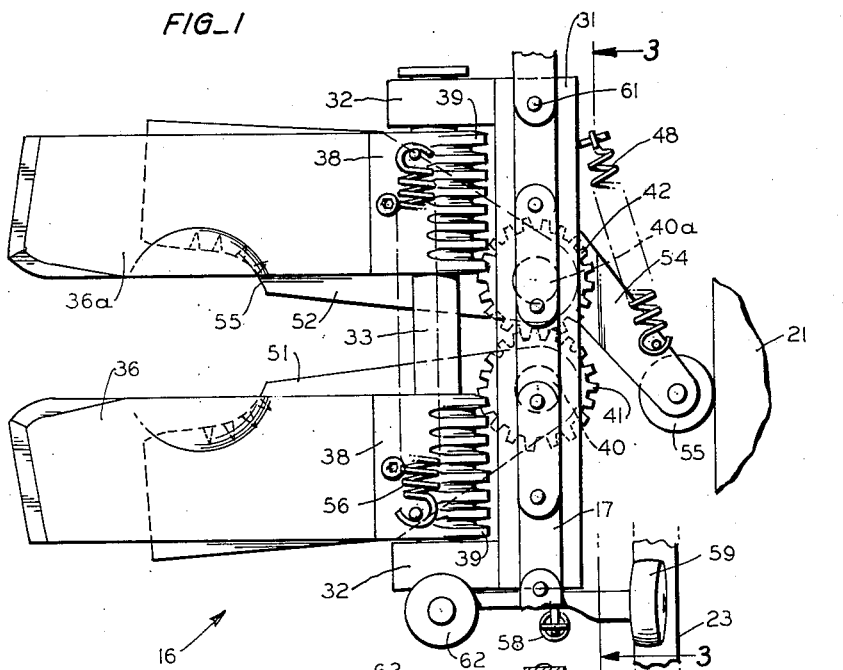
FIG_1
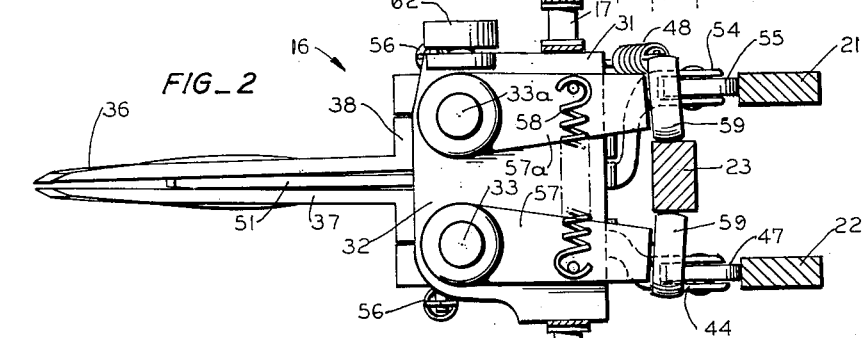
FIG_2
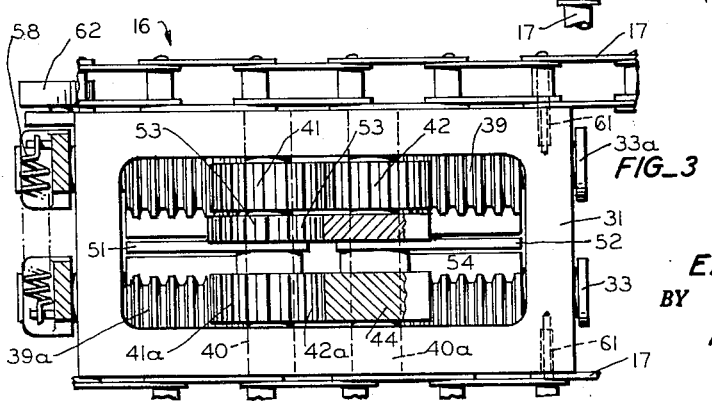
FIG_3
INVENTOR.
EARL R. ANDERSON
BY
Allen and Chromy
ATTORNEYS Jan. 28, 1964 E. A. ANDERSON 3,119,426
PITTER FOR DRUPACEOUS FRUITS
Filed March 8, 1961 3 Sheets-Sheet 2
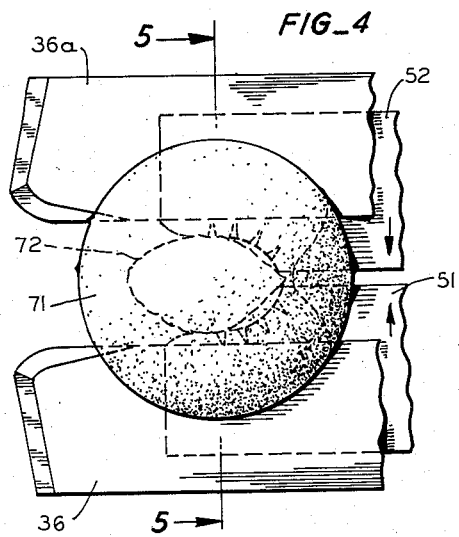
FIG_4
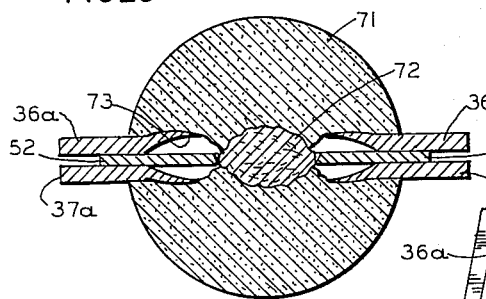
FIG_5
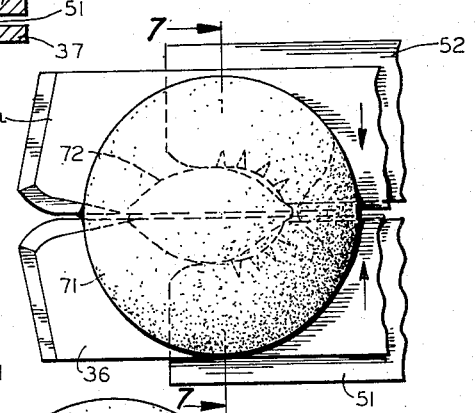
FIG_6
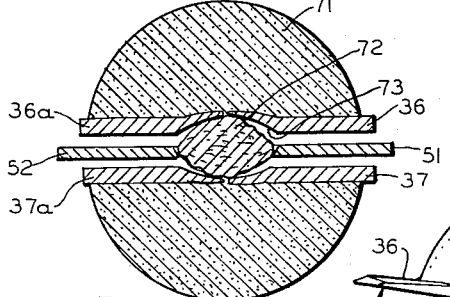
FIG_7
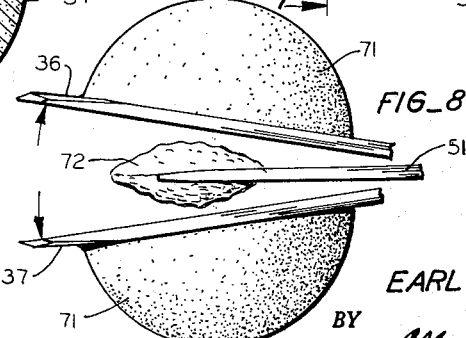
FIG_8
INVENTOR.
EARL R. ANDERSON
BY
ATTORNEYS

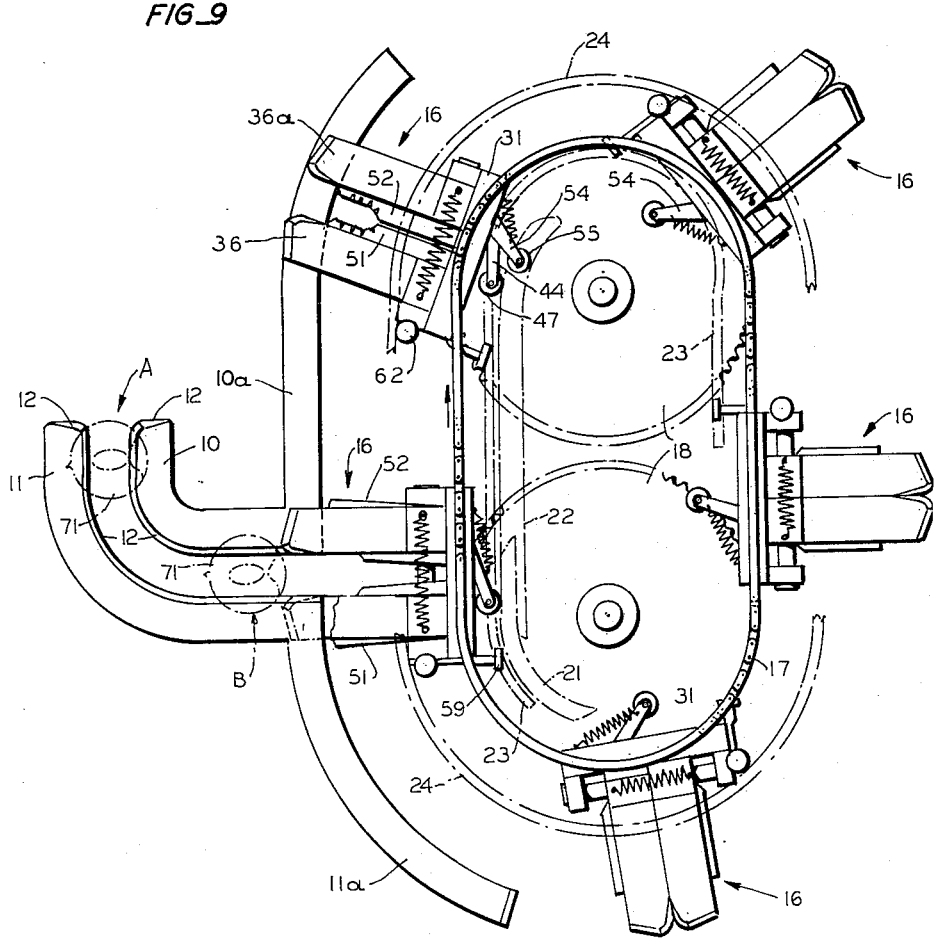

United States Patent Office 3,119,426
Patented Jan. 28, 1964

3,119,426
PITTER FOR DRUPACEOUS FRUITS
Earl R. Anderson, 1900 Pollard Road, Campbell, Calif.
Filed Mar. 8, 1961, Ser. No. 94,275
7 Claims. (Cl. 146—28)

The present invention relates to a pitter for drupaceous fruit, such as freestone peaches for example, and is of the type adapted to operate with a peach which has its flesh cut in the plane of the suture line thereof so as to provide a plane of entry for the pitting blades. The invention is concerned more particularly with good arrangement, mounting, and mode of operation of the pitting blades for drupaceous fruit such as a freestone peach, to effectively separate the flesh of the fruit from the pit without effecting a cut around tht pit, the flesh being separated from the pit by the shearing and wedging action of the blades as they operate during the pitting movement.

It is the general object of this invention to provide an improved pitter for drupaceous fruits.

It is another object of the invention to provide a pitter in which certain pit and flesh-separating blades operate to ride closely up over the pit and shear or wedge the flesh away from the pit, and including means for effectively separating all fibers of the flesh from the pit.

A further object of the invention is to provide a pitter for drupaceous fruits including a set of four blades arranged as opposed pairs of blades in which the blades first enter the flesh of the fruit at the cut portion thereof to engage the pit, and then are cammed up around the pit to effect the separation of the flesh therefrom, including a final separating movement in which the blades move in a direction away from the pit while in closed position thereover so as to effectively separate and break any removing fibers of the flesh which may remain attached to the pit after the first pit-encompassing movement of the blades.

Another object of the invention is to provide a plurality of fruit locating and pit gripping blades which surround the pit of the fruit and encompass it and enable the fruit to be carried by holding the pit.

Other objects and advantages of the invention will become apparent from the following description of the preferred embodiment thereof, taken in connection with the accompanying drawings, in which:

FIG. 1 is a side elevational view of a pitting head of the apparatus;

FIG. 2 is an end elevational view, partly in section, of the pitting head;

FIG. 3 is a bottom elevational view, partially in section, being indicated by the plane of the line 3—3 in FIG. 1;

FIG. 4 is a fragmentary enlarged side elevational view showing a peach on the pitting blades at the stage of the operation when the pit-gripping blades have been engaged with the pit to hold the peach firmly in place;

FIG. 5 is a sectional view taken in the plane of the line 5—5 in FIG. 4;

FIG. 6 is a view similar to FIG. 4 but showing the blades after they have completed their pit-encompassing and flesh-severing function;

FIG. 7 is a sectional view taken in a plane indicated by the lines 7—7 in FIG. 6;

FIG. 8 is a fragmentary elevational view taken at right angles to the views shown in FIGS. 4 and 6, and showing the peach after its blades have been moved transversely to the direction of their original movement to effectively separate the peach halves from the pit;

FIG. 9 is a schematic elevational view illustrating in general the arrangement of a pitting apparatus, including a series of pitting heads disclosed in FIGS. 1 through 8.

In the canning of peaches, it is undesirable to have present in the peach certain of the natural characteristics which are found in the plane of the suture of the peach. This includes the suture having a crease formation, and the tip of the fruit where there is a small spike or fin on the pit. Frequently, a slice is removed from the flesh of the fruit including the natural crease formation and fibers, and the portion of the fruit at the spike end of the pit. Other canners of peaches prefer to merely place an annular incision in the flesh of the fruit passing through and preferably confined to the suture plane of the pit, and there to wedge the parts of the pulp apart to prevent the insertion of the pitting mechanism.

The present invention may employ either method of producing the initial cut in the flesh of the fruit by surrounding the pit and containing the suture plane of the flesh and the pit, or the cut may be effected as a part of the operation.

Referring to FIG. 9, there is illustrated at the left of this figure, a pair of L-shaped slicing knives 10 and 11, having respective knife edges 12 formed at their ends and along their opposed edges, these blades being suitably mounted and having respective extensions 10a and 11a for a purpose later described. Associated with these slicing blades 10 and 11 are a series of peach-pitting heads 16, which will be described in detail hereinafter, and which are carried by chain means 17 on a pair of sprockets 18 traveling in the direction of the arrow adjacent to the chain 17. Associated with these traveling pitting heads 16 are a plurality of cam controls therefor which are indicated generally at 21, 22, 23 and 24, and whose functions will be referred to hereinafter. For the present it is sufficient to understand that an operator places a peach on the knives 10 and 11 as indicated in dotted lines at A with its suture plane lying in the plane of the knives and with its pit adapted to pass between the knives so that the knife edges 12 sever the fruit substantially to the pit. Also because the L-shaped path of travel, if the peach is held oriented in the same position as it travels from the vertical leg of the L to the horizontal leg of the L, the flesh will be sliced almost entirely around the pit in the plane of the suture line, so that this cut of the fruit will be presented to the blades of the adjacent pitting head 16 as will be later described.

Referring to FIGS. 1, 2 and 3, each pitting head includes a rectangular frame 31, having end flanges 32 projecting therefrom to pivotally mount parallel shafts 33 and 33a. The shafts 33 and 33a provide a mounting for a set for four blades arranged in pairs, one pair being slidably and non-rotatably mounted on the shaft 33, and the other pair being slidably and non-rotatably mounted on the shaft 33a. These blades comprise the generally rectangular shaped blades 36—36a as one pair and 37—37a as another pair, these blades having hubs 38 which are slidably and nonrotatably mounted on the shaft 33 and 33a respectively, by suitable flange and keyways. The hubs 38 are provided on one-half of their circumference with rack teeth 39 which mesh with respective intermeshing pinions 41 and 42 mounted on respective shafts 40 and 40a which are journaled on the frame, so that the in-and-out approaching movement of the blades 36 and 36a is effected simultaneously. Similar pinions 41a and 42a on the shafts 40 and 40a are meshed with similar rack teeth 39a of the blades 37 and 37a. The pinion 42 is secured to shaft 40a, and the pinion 42a is formed integrally with a control arm 44 carrying a roller 47 engaged with the cam track 22. The pinions 41 and 41a are loose on the shaft 40.

Disposed respectively between the blades 36 and 37 and the blades 36a and 37a are a pair of pit-locating and gripping blades 51 and 52 which are carried on the shafts 40 and 40a between the parallel pairs of pinions 41 and the pinions 42 and carry respective smaller pinions 53, secured to and free on the shaft 40a and 40, respectively. One pinion 53 has integral therewith an arm 54 carrying a roller 55 which engages the cam track 21 under the influence of spring 48. Referring to FIG. 1, it will be noted that the blades 51 and 52 each have a recess 55 on their facing surfaces and terminating at the end of the blades, this recess being toothed and providing side and end wall portions to engage a side and an end of the pit. When the blades 51 and 52 are closed as seen in FIGS. 4 and 5, for example, they form a stop for the pit and effectively grip the pit substantially along its suture line. The curvature of the recesses conform substantially to the outline of the pit as seen in FIG. 4, for example. Also, as seen in FIG. 1, the blades 36 and 36a are connected by a tension spring 56 so that they are constantly urged together, a similar spring being provided for the blades 37 and 37a.

At the ends of the respective shafts 33 and 33a there are provided extending arms 57 and 57a connected by a spring 58 and carrying rollers 59 engaging at either side of a central cam member 23.

For mounting each pitting head on the chain 17 there is provided a pivot pin 61 (FIG. 3) adjacent one end which is secured on the frame 31 and extends through one of the pivot pins of the adjacent chain 17. At the other or trailing end, the frame 31 carries a roller 62 which cooperates with the cam track 24.

In operation, the pitting head 16 which is in cooperative relation with the blades 10 and 11 (FIG. 9) is conditioned, as shown in FIG. 1, with the pit-gripping blades 51 and 52 separated, and with the flesh-entering blades 36, 36a, 37 and 37a spaced apart with respect to their sliding movement on the shafts 33 and 33a, but held together with respect to their separating movement so as to present their sharpened end edges to the cut in the fruit. A peach 71 is carried in translatory fashion along the blades 10 and 11 as shown in dotted lines at A and B in FIG. 9 and is positioned on the blades 36, 36a, 37 and 37a as shown in FIG. 4, the blades 51 and 52 when closed providing a pit stop. The flesh of the fruit is wedged apart by the blades 36, 36a, 37 and 37a, as seen in FIG. 5, and then the pit-gripping blades 51 and 52 are allowed to close by the cam 21 so as to grip the pit as shown in FIG. 4.

During the time the peach is being moved away from its position in alignment with the blades 10 and 11, as shown in FIG. 9, the extension 11a continues to engage the cut in the flesh of the fruit and to serve as an auxiliary holding and positioning member, as seen most clearly in FIG. 9.

After the pitting edge passes beyond the end of the cam 21, as seen in FIG. 9, the springs 56 become effective to cause translatory closing movement of the blades 36 and 36a and of the blades 37 and 37a so that the recessed portions 73 thereof are moved to engage the pit and are cammed up over its rounded contour in pit-encompassing relation, and also separating the flesh of the fruit 71 from its pit 72, the parts arriving approximately at the position shown in FIG. 7. It will be appreciated that the recessed portions 73 of the respective blades 36, 36a, 37 and 37a effectively form a socket to encompass the peach pit so that after definite location of a pit by the pit-gripping blades 51 and 52 and engagement of the pit by the socket, the peach is carried by its pit through the various operations in removing the flesh of the fruit from the pit. It will be appreciated that during the approaching movement of the blades 36, 36a, 37 and 37a, the straight edges of these blades presented to the flesh of the fruit, together with the translatory approaching movement of these blades performs an effective and clean shearing and separating action of the flesh of the fruit from the pit.

Subsequently, the rollers 59 ride off the cam track 23 toward the middle right-hand portion of FIG. 9, and the blades 36 and 37 are separated, as well as the blades 36a and 37a, to effectively break any remaining threads or fibers attaching the flesh of the fruit to the pit, and leaving the pitted halves of the fruit free to fall into a suitable receptacle or onto a suitable conveyor, the pit 72 being retained by the pit-gripping blades 51 and 52. Subsequently, the cam 21 becomes effective to open these pit-dripping blades 51 and 52 and the pit is discharged shortly before the pitting head arrives again at the peach receiving station. It will be noted that while the blades 36, 36a, 37 and 37a are still separated, the pitting head moves into overlapping relation with the extension 10a of the blade 10 so that when these blades are again closed by the action of the cam 21, their alignment is insured with respect to the next peach to be fed thereto.

During the bottom half of the travel while the blades 36 etc. are open, the pitting head can be subjected to suitable washing action by water and/or steam to insure the proper clean condition to place it in proper peach receiving condition.

It will be appreciated that a suitable intermittent step-by-step drive is provided, for example, by a suitable Geneva mechanism, so as to successively bring the pitting heads to the peach receiving station into alignment with the blades 10 and 11.

While I have shown and described a preferred embodiment of the invention, it will be apparent that the invention is capable of variation and modification from the form shown so that the scope thereof should be limited only by the scope of the claims appended hereto.

What I claim is:

1. In a pitter for drupaceous fruit such as freestone peaches, said pitter being of a type adapted to operate with peaches having the flesh cut through to the pit in a plane coinciding with the plane containing the suture line thereof, a frame, a set of four pitting blades arranged as opposed pairs of blades and projecting in the same general direction from the frame, means mounting each pair of pitting blades on said frame for in-and-out movement with respect to each other and with respect to a peach positioned therebetween to cause each pair of pitting blades to enter the cut in the flesh of the fruit from opposite sides of the pit, each pair of said blades having pit-engaging recesses formed on adjacent sides of said blades for embracing a pit, said mounting means also mounting each of said pair of pitting blades for approaching and separating movement with respect to the other said pair of pitting blades in a general direction substantially at a right angle to the direction of said in-and-out movement, a pair of pit-gripping blades on said frame and lying substantially in a plane, means mounting said pit-gripping blades for relative approaching movement in a plane to cause said pit-gripping blades to enter the cut in the flesh of the fruit and to grip the pit therebetween with said pit-gripping blades substantially engaging said pit in a plane containing said suture line of the peach, a first operating means for said set of pitting blades for effecting said in-and-out movement, a second operating means for said set of pitting blades for effecting said approaching and separating movement thereof, and a third operating means for causing movement of said pit-gripping blades to and from pit-gripping position.

2. In a pitter for drupaceous fruit such as freestone peaches, said pitter being of a type adapted to operate with peaches having the flesh cut through to the pit in a plane coinciding with the plane containing the suture line thereof, a frame, a set of four pitting blades arranged as opposed pairs of blades, means mounting each pair of pitting blades on said frame for translating in-and-out movement with respect to each other and with respect to a peach positioned therebetween to cause each pair of pitting blades to enter the cut in the flesh of the fruit from opposite sides of the pit, said set of pitting blades presenting straight line edges to a peach to be pitted, and each pair of said blades having oppositely disposed pit-engaging recesses formed on adjacent sides of said blades so that a pit is adapted to be embraced by said four recesses upon approaching movement of the respective pairs of blades to shear the flesh of the fruit away from the pit, said mounting means also mounting each of said pair of pitting blades for approaching and separating movement with respect to the other said pair of pitting blades in a general direction substantially at a right angle to the direction of said in-and-out movement, a pair of pit-gripping blades on said frame, means mounting said pit-gripping blades for relative approaching movement in a plane to cause said pit-gripping blades to enter the cut in the flesh of the fruit and to grip the pit therebetween with said pit-gripping blades substantially engaging said pit in a plane containing said suture line of the peach, a first operating means for said set of pitting blades for effecting said in-and-out movement, a second operating means for said set of pitting blades for effecting said approaching and separating movement thereof, and a third operating means for causing movement of said pit-gripping blades to and from pit-gripping position.

3. In a pitter for drupaceous fruit such as freestone peaches, a frame, a set of four pitting blades arranged as opposed pairs of blades and with adjacent blades of said pairs in close side-by-side relation and having pit-encompassing recesses on the sides thereof, means mounting each pair of pitting blades on said frame for in-and-out movement with respect to each other and with respect to a peach positioned therebetween to cause each pair of pitting blades to enter the flesh of the fruit, said mounting means also mounting each of said pair of pitting blades for approaching and separating movement with respect to the other of said pair of pitting blades in a general direction substantially at a right angle to the direction of said in-and-out movement, pit-gripping means on said frame, a first operating means for said set of pitting blades for effecting said in-and-out movement, a second operating means for said set of pitting blades for effecting said approaching and separating movement thereof, and a third operating means for operating said pit-gripping means.

4. In a pitter for drupaceous fruit such as freestone peaches, a frame, a set of four pitting blades arranged as opposed pairs of blades and with adjacent blades of said pairs in close side-by-side relation, means mounting each pair of pitting blades on said frame for in-and-out movement with respect to each other and with respect to a peach positioned therebetween to cause each pair of pitting blades to enter the flesh of the fruit, said set of pitting blades presenting straight line edges to a peach to be pitted, and each pair of said blades having oppositely disposed pit-engaging recesses formed on adjacent sides of said blades so that a pit is adapted to be embraced by said four recesses upon approaching movement of the respective pairs of blades to shear the flesh of the fruit away from the pit, said mounting means also mounting each of said pair of pitting blades for approaching and separating movement with respect to the other said pair of pitting blades in a general direction substantially at a right angle to the direction of said in-and-out movement, pit-gripping means on said frame, a first operating means for said set of pitting blades for effecting said in-and-out movement, a second operating means for said set of pitting blades for effecting said approaching and separating movement thereof, and a third operating means for operating said pit-gripping means.

5. In a pitter for drupaceous fruit such as freestone peaches, said pitter being of a type adapted to operate with peaches having the flesh cut through to the pit in a plane coinciding with the plane containing the suture lines thereof, a frame, a pair of parallel shaft members pivoted in said frame, a set of four blades arranged as opposite pairs, one pair of said set being slidably and non-rotatably mounted on one of said shafts, and the other pair of said set of blades being slidably and non-rotatably mounted on the other ones of said shafts, said set of four blades extending outwardly to one side of said frame and having sharpened ends to engage a cut in a peach, said set of pitting blades presenting straight line edges to a peach to be pitted, and each pair of said blades having oppositely disposed pit-engaging recesses formed on adjacent sides of said blades so that a pit is adapted to be embraced by said four recesses upon approaching movement of the respective pairs of blades to shear the flesh of the fruit away from the pit, a spring means urging said pair of blades together to engage within the flesh of the fruit and against the pit of the fruit and to cause said recessed portions to ride up over the pit of the fruit until the blades of the respective pair substantially are in contact, means for rocking said shafts to effect separating movement of said blades to tear loose any shreds of flesh still attached to the pit, and a pair of pit-grippers interposed between blades of said set so as to engage the pit in holding relation.

6. In a pitting head for picking up and carrying a fruit such as a peach by the pit, a frame, a plurality of at least four blades arranged in pairs to encompass the pit of the fruit by entry of pairs of the blades in a cut in the flesh of the fruit containing the suture line and advancing the blades to engage the pit, each of said blades having a straight edge presented to the fruit and having a recessed portion on the pit engaging side thereof, said four recessed portions comprising a pit encompassing and holding socket, so that when the blades are advanced into the pit, the pit is seated in and encompassed by the socket formed by the four recesses, and a plurality of at least two pit engaging blades lying in a plane for engaging the pit in a plane containing the suture thereof and including means forming a stop to locate the pit in reference to said four blades, means mounting said four blades and said pit-engaging blades on said frame for movement thereon, and means for operating said pit-engaging blades to grasp and hold the peach by the pit.

7. In a pitting head for picking up and carrying a fruit such as a peach by the pit, a frame, a plurality of at least four blades arranged in pairs to encompass the pit of the fruit by entry of pairs of the blades in a cut in the flesh of the fruit containing the suture line and advancing the blades to engage the pit, each of said blades having a straight edge presented to the fruit and having a recessed portion on the pit engaging side thereof, said four recessed portions comprising a pit encompassing and holding socket, so that when the blades are advanced into the pit, the pit is seated in and encompassed by the socket formed by the four recesses, and for engaging the pit to locate the pit in reference to said four blades, means mounting said blades on said frame for movement therein, and means for operating said blades to grasp and hold the peach by the pit.

References Cited in the file of this patent

UNITED STATES PATENTS

| | | |
|---|---|---|
| 1,237,528 | Knox | Aug. 21, 1917 |
| 1,263,742 | Chase | Apr. 23, 1918 |
| 1,334,449 | Griffin | Mar. 23, 1920 |
| 2,588,575 | Rollins | Mar. 11, 1952 |
| 2,594,362 | Skog | Apr. 29, 1952 |
| 2,652,085 | Ansley | Sept. 15, 1953 |